Jan. 2, 1951  W. I. BASS  2,536,152
AMPHIBIOUS VEHICLE AND COVER THEREFOR
Filed April 12, 1948  3 Sheets-Sheet 3

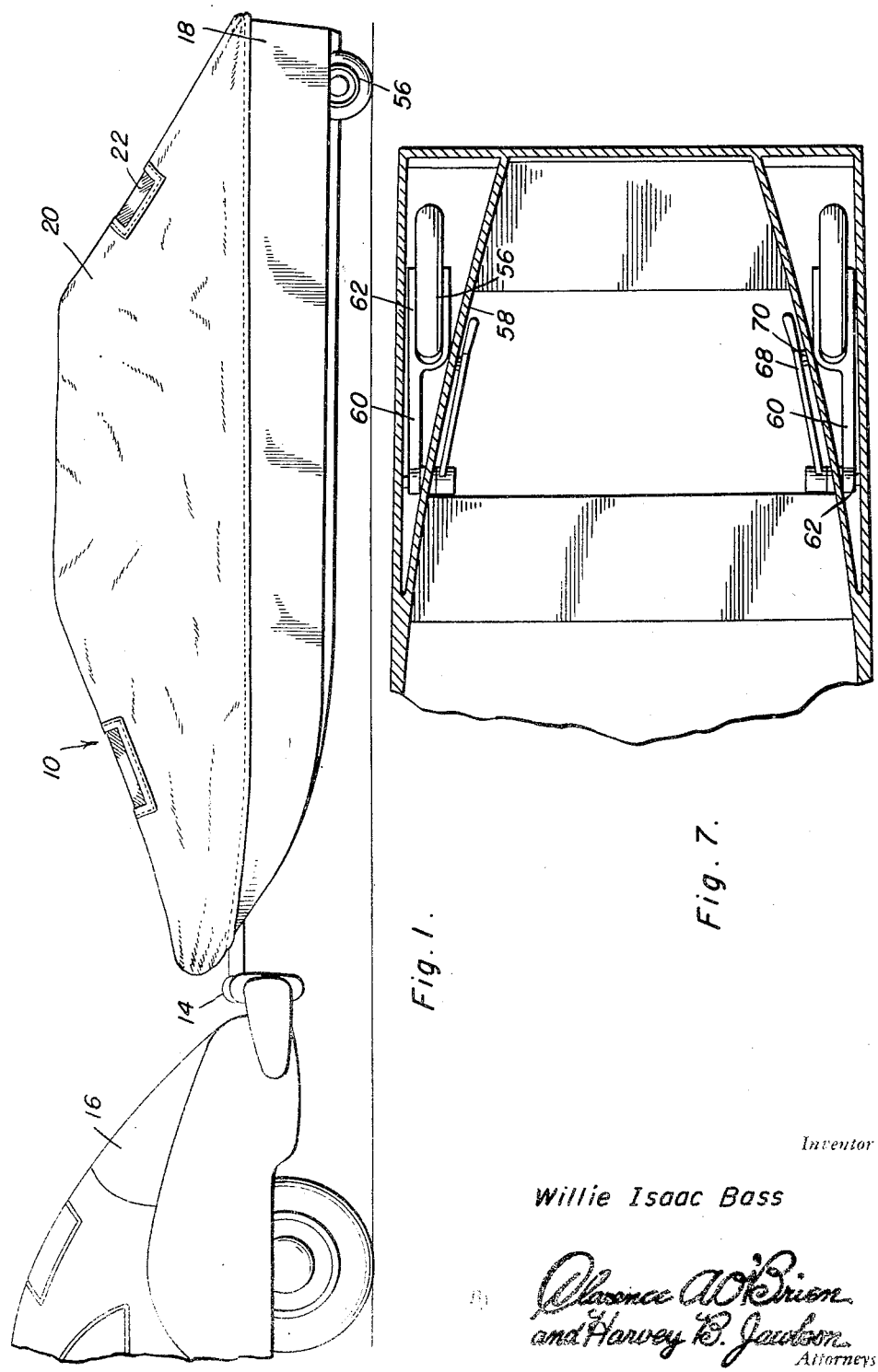

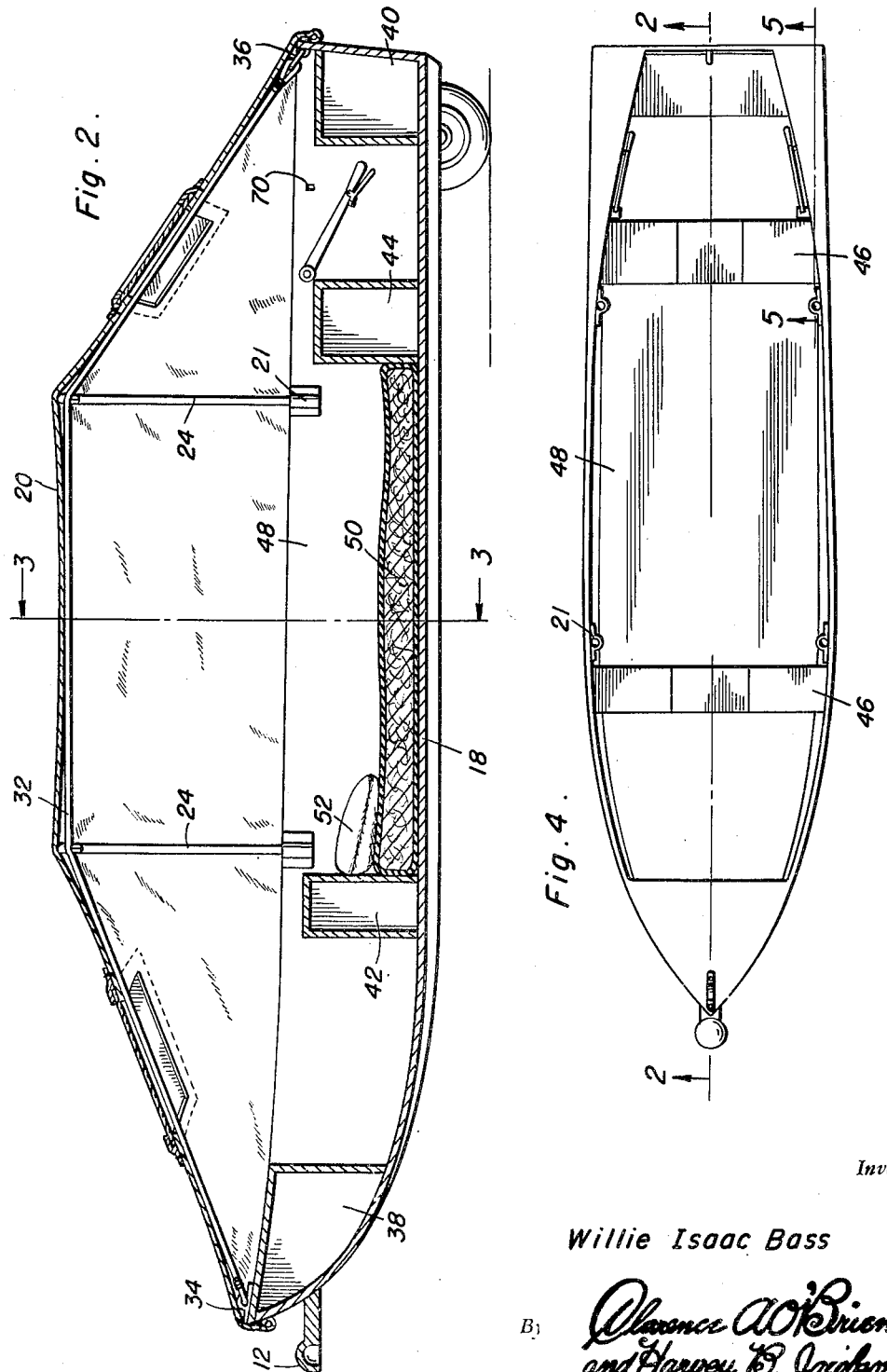

Inventor
Willie Isaac Bass
By Clarence A. O'Brien
and Harvey B. Jacobson
Attorneys Patented Jan. 2, 1951

2,536,152

UNITED STATES PATENT OFFICE 2,536,152

AMPHIBIOUS VEHICLE AND COVER THEREFOR

Willie Isaac Bass, Fayetteville, N. C.

Application April 12, 1948, Serial No. 20,401

2 Claims. (Cl. 9—1)

This invention relates to an amphibious boat and is adapted to be used on water or on land as a baggage or luggage carrier and sleeping chamber, thereby serving the double function of a boat as well as storage and sleeping quarters when not in normal use.

A primary object of the invention is to provide a boat that is suitable as both a storage compartment and sleeping space as well as a fishing boat when such sport is desired without the necessity for converting the vessel in any manner.

Another object of the invention is to provide means whereby the boat is adapted to be readily secured to an automobile in order to be transported from place to place and contains other means whereby such travel over land is made possible, and includes means for retraction thereof to eliminate any resistance when the boat is used in water.

Another object of the invention is to provide a boat which is capable of being covered to both protect the sleeper and the luggage contained therein from the elements and thereby permit the boat to be used in any type of weather that may prevail.

And another object of the invention is to provide a device that will prevent the boat from sinking in the event that it is overturned.

Yet another object of the invention is to provide means that will serve as the sleeping mattress as well as substitute as a life raft in the event that the boat capsizes or sinks due to collision or the like.

And yet another object of the invention is to provide means to preserve any food that is taken along on the trip and yet not occupy so much space so as to amount to a waste thereof, but be utilized as part of the seating arrangement as well.

In addition to the above, this invention comprehends improvements in details of construction and arrangement of parts to be hereinafter described and set forth in the claims.

In the following drawings, in which similar and corresponding parts are designated by the same reference characters throughout the several views, Figure 1 is a side elevation of the device of the invention attached to the rear of a motor vehicle, with the cover in place;

Figure 2 is a vertical section taken on the line 2—2 in Figure 4;

Figure 4 is a top plan view of the boat of the invention, with the cover removed;

Figure 7 is a horizontal view of the retractible wheel and protective housing and taken substantially along the line 7—7 of Figure 6.

Referring to the figures, the boat of the invention is shown generally at 10 and includes a hitch 12, preferably of the ball and socket type, although any other types may be used, for suitable attachment to a rear bumper 14 on a motor vehicle 16.

Figure 3:
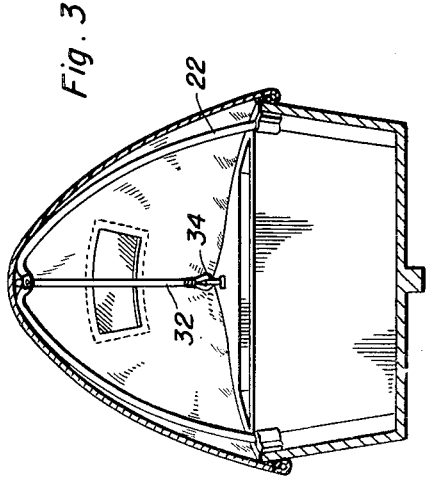
Figure 3 is a vertical transverse view taken along the line 3—3 of Figure 2.
Figure 8:
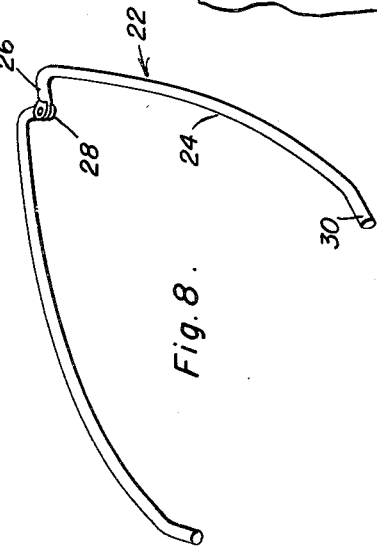
Figure 8 is a perspective view of the pivoted brace means for retaining the canvas cover in the position illustrated in Figure 1.

Boat 10 consists of the usual body 18 of sheet metal or marine plywood construction and is adapted to retain a canvas cover 20 thereon, for a purpose presently to become apparent. Khaki cover 20 contains windows 22 for light and for visibility. Hull 18 includes two pairs of spaced sockets 21 for the shanks of oar-locks serving the double function of receiving said shanks when the boat is to be used in water or to retain therein two pairs of drop rib easners or braces 22, as is best seen in Figure 8, used when canvas 20 is to be placed in the position illustrated in Figures 1-3. Braces 22 consist of a pair of outwardly buckled ribs or rods 24 formed into L-shape flanges 26 at one extremity thereof and pivoted together at 28 in suitable manner, the other extremity being bent at 30 to seat into the sockets 21. A suitable rope 32, and preferably the anchor rope, is secured at the bow by eye means 34 and by links and eye means 36 at the stern, rope 32 being trained over the notches formed by pivoted L-arms 26 of easners 22 to thereby assist in retaining canvas 20 in raised position.

Referring to Figures 1 and 2, the inner construction of boat 18 is readily seen. Air-tight compartments 38 and 40, which may serve as seats, are provided at either side of the boat and assist in maintaining the structure afloat. A live well 42 and an ice box 44 are spaced a short distance from each of seats 38 and 40, and, together with transversely extending compressed gas buoy pockets 46 provide two more seats as well as construction to make boat 18 practically unsinkable. A large space 48 is supplied between members 42 and 44 which space serves as sleeping quarters and storage space. An inflated rubberized mattress 50 occupies the greater portion of space 48 and inflated pillows 52 insure comfort in sleeping. In the event that the boat is capsized, or some other disaster occurs, mattress 50 will substitute as a life raft and pillows 52 serve the function of life preservers.

Figure 5:
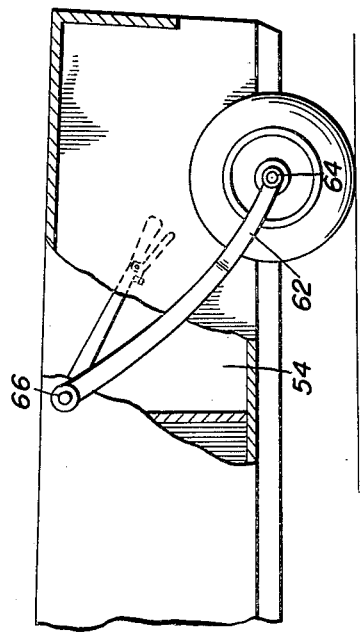
Figure 5 is a cross-sectional view of the retractible wheel in extended position, and is taken substantially along the line 5—5 of Figure 4.
Figure 6:
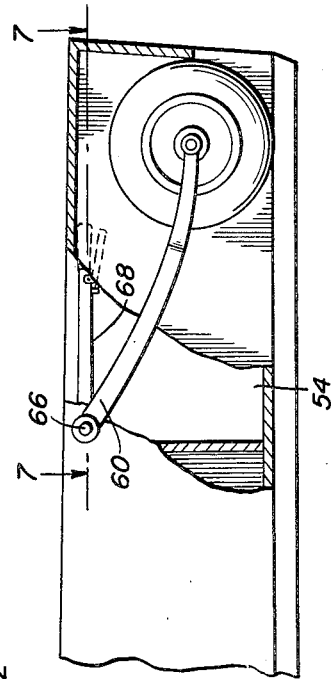
Figure 6 is a view similar to Figure 5 with the wheels in retracted position.

As is clearly seen in Figures 5-7, the compartment 54 is provided at the rear of boat 18 to retain a pair of drop wheels 56 therein, of pneumatic type or the like. Wheel guards 58, extend above the inner surface of boat 18 to protect wheels 56 from becoming snarled with any matter that might be floating in the water. Cantilever springs 60 are forked or bifurcated at 62 to be retained on wheels 56 at 64 and are pivoted at the other ends thereof at 66, well above the water line to hand or wheel levers 68. Levers 68 are secured to the sides of guards 58 and are retained in position by suitable cleats or locks 70.

The use of the device is readily apparent from the above description. Boat 18 is hitched to a vehicle at 14 and wheels 56 are in the extended position seen in Figure 5. When it is to be used for fishing, lever 68 is moved up and wheels 56 are then in the retracted position illustrated in Figure 6. When the device is to be used for sleeping quarters, or to protect boat 18 from adverse weather, rib members 22 are inserted into oarlocks 20 and cable 32 extends thereover, both serving to retain canvas 22 in elevated position. It is almost impossible for boat 18 to capsize due to air spaces 38, 40 and 46, but in the event that this occurs, mattress 50 is used as a life raft, and pillows 52 may be used as life preservers.

From the above, it will be seen that the several objects of the invention are attained and other advantageous results achieved.

As many modifications of the embodiments above illustrated might be made without departing from the spirit or scope of the present invention, it is intended that the above description and accompanying drawings and claims shall be interpreted as illustrative and not in a limiting sense.

Having described the invention what is claimed as new is:

1. In an amphibious vehicle, a hull including a plurality of transversely opposed sockets for the shanks of oar-locks secured to said hull, a cover for said hull, braces terminally received in said sockets and extending vertically therefrom and transversely of the hull, and cable means secured to each end of said hull and trained over said braces longitudinally of the hull, said braces and cable retaining a central portion of said cover in vertically spaced relation to said hull, said braces each consisting of a pair of outwardly diverging rib members pivotally secured together at one end thereof and received in said sockets at the other ends.

2. In an amphibious vehicle, a hull including a plurality of transversely opposed sockets for the shanks of oar-locks secured to said hull, a cover for said hull, braces terminally received in said sockets and extending vertically therefrom and transversely of the hull, and cable means secured to each end of said hull and trained over said braces longitudinally of the hull, said braces and cable retaining a central portion of said cover in vertically spaced relation to said hull, said braces each consisting of a pair of outwardly diverging rib members pivotally secured together at one end thereof and received in said sockets at the other ends, said rib members being L-shaped at the pivoted ends thereof to provide seats for said cable means.

WILLIE ISAAC BASS.

REFERENCES CITED

The following references are of record in the file of this patent:

UNITED STATES PATENTS

| Number | Name | Date |
| --- | --- | --- |
| 143,052 | Adams | Sept. 23, 1873 |
| 753,425 | Noel | Mar. 1, 1904 |
| 1,035,046 | Pitre | Aug. 6, 1912 |
| 1,177,625 | Hopper | Apr. 4, 1916 |
| 1,958,008 | MacDougall | May 8, 1934 |
| 2,203,565 | Field | June 4, 1940 |
| 2,283,648 | Samdahl | May 19, 1942 |
| 2,294,110 | Donaldson | Aug. 25, 1942 |
| 2,370,508 | Wilkie | Feb. 27, 1945 |